(12) United States Patent
Wivell et al.

(10) Patent No.: US 8,239,175 B2
(45) Date of Patent: *Aug. 7, 2012

(54) GEOSPATIAL MODELING SYSTEM PROVIDING POISSON-BASED GEOSPATIAL DATA SET MERGING AND RELATED METHODS

(75) Inventors: Charles Wivell, Palm Shores, FL (US); Patrick Kelley, Palm Bay, FL (US); Josef Allen, Melbourne, FL (US); Mark Rahmes, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 1091 days.

This patent is subject to a terminal disclaimer.

(21) Appl. No.: 12/030,386

(22) Filed: Feb. 13, 2008

(65) Prior Publication Data

US 2012/0179433 A1 Jul. 12, 2012

(51) Int. Cl.
G06F 7/60 (2006.01)
G06F 17/10 (2006.01)
(52) U.S. Cl. ............. 703/2; 382/276; 382/284; 382/294
(58) Field of Classification Search ...... 703/2; 382/276, 382/284, 294
See application file for complete search history.

(56) References Cited

U.S. PATENT DOCUMENTS

| | | | |
|---|---|---|---|
| 6,046,695 A | 4/2000 | Poehler et al. | 342/25 |
| 7,187,452 B2 | 3/2007 | Jupp et al. | 356/501 |
| 2005/0265631 A1* | 12/2005 | Mai et al. | 382/284 |

OTHER PUBLICATIONS

Levin et al. "Seamless Image Stitching in the Gradient Domain", Springer 2004.*
Zomet et al. "Seamless Image Stitching by Minimizing False Edges" IEEE 2006.*
Zhou et al., *Poisson Image Editing & Terrain Synthesis*, Apr. 29, 2008.
Chen, *Poisson Equation in Image Editing*, Apr. 29, 2006.
Zhou et al., *Poisson Image Editing & Texture Based Terrain Synthesis*, available at www.howardzzh.com/research/poissonImageEditing/index.htm, 2003.
Perez et al., *Poisson Image Editing*, ACM Transactions on Graphics (SIGGRAPH'03), pp. 313-318, 2003.

* cited by examiner

*Primary Examiner* — Saif Alhija
(74) *Attorney, Agent, or Firm* — Allen, Dyer, Doppelt, Milbrath & Gilchrist, P.A.

(57) ABSTRACT

A geospatial modeling system may include a geospatial model data storage device, and a processor cooperating with the geospatial model data storage device for merging first and second geospatial data sets for corresponding first and second geospatial regions. The processor may be for generating seam-smoothed geospatial data for a corresponding selected geospatial region between adjacent portions of the first and second geospatial regions by applying Poisson's equation to data from at least one of the first and second geospatial data sets for the selected geospatial region using boundary conditions based upon data along corresponding interfaces between the selected geospatial region and adjacent portions of the first and second geospatial regions.

24 Claims, 27 Drawing Sheets

GEOSPATIAL MODELING SYSTEM PROVIDING POISSON-BASED GEOSPATIAL DATA SET MERGING AND RELATED METHODS

FIELD OF THE INVENTION

The present invention relates to the field of data modeling, and, more particularly, to modeling systems such as geospatial modeling systems and related methods.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation model (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, a basic DEM typically models terrain as a plurality of curved surfaces and any discontinuities therebetween are thus "smoothed" over.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR), for example.

Another similar system from Harris Corp. is LiteSite®. LiteSite® models provide automatic extraction of ground, foliage, and urban digital elevation models (DEMs) from LIDAR and synthetic aperture radar (SAR)/interfermetric SAR (IFSAR) imagery. LiteSite® can be used to produce affordable, geospatially accurate, high-resolution 3-D models of buildings and terrain.

U.S. Pat. No. 6,654,690 to Rahmes et al., which is also assigned to the present Assignee and is hereby incorporated herein in its entirety by reference, discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

In many instances there will be voids or gaps in the data used to generate a geospatial or other model. The voids negatively affect the quality of the resulting model, and thus it is desirable to compensate for these voids while processing the data, if possible. Various interpolation techniques are generally used for filling in missing data in a data field. One such technique is sine interpolation, which assumes that a signal is band-limited. While this approach is well suited for communication and audio signals, it may not be well suited for 3D data models. Another approach is polynomial interpolation. This approach is sometimes difficult to implement because the computational overhead may become overly burdensome for higher order polynomials, which may be necessary to provide desired accuracy.

One additional interpolation approach is spline interpolation. While this approach may provide a relatively high reconstruction accuracy, this approach may be problematic to implement in a 3D data model because of the difficultly in solving a global spline over the entire model, and because the required matrices may be ill-conditioned. One further drawback of such conventional techniques is that they tend to blur edge content, which may be a significant problem in a 3D topographical model.

Another approach for filling in regions within an image is set forth in U.S. Pat. No. 6,987,520 to Criminisi et al. This patent discloses an exemplar-based filling system which identifies appropriate filling material to replace a destination region in an image and fills the destination region using this material. This is done to alleviate or minimize the amount of manual editing required to fill a destination region in an image. Tiles of image data are "borrowed" from the proximity of the destination region or some other source to generate new image data to fill in the region. Destination regions may be designated by user input (e.g., selection of an image region by a user) or otherwise (e.g., specification of a color or feature to be replaced). In addition, the order in which the destination region is filled by example tiles may be configured to emphasize the continuity of linear structures and composite textures using a type of isophote-driven image-sampling process.

With respect to geospatial models such as DEMs, various approaches have been attempted to address error recognition and correction due to voids, etc. One such approach is set forth in an article by Gousie entitled "Digital Elevation Model Error Detection and Visualization," 4th ISPRS Workshop on Dynamic & Multi-dimensional GIS (Pontypridd, Wales, UK, 2005), C. Gold, Ed., pp. 42-46. This paper presents two methods for visualizing errors in a DEM. One method begins with a root mean square error (RMSE) and then highlights areas in the DEM that contain errors beyond a threshold. A second method computes local curvature and displays discrepancies in the DEM. The visualization methods are in three dimensions and are dynamic, giving the viewer the option of rotating the surface to inspect any portion at any angle.

Another example is set forth in an article by Grohman et al. entitled "Filling SRTM Voids: The Delta Surface Fill Method," Photogrammetric Engineering & Remote Sensing, March 2006, pp. 213-216. This article discusses a technique for fillings voids in SRTM digital elevation data is that is intended to provide an improvement over traditional approaches, such as the Fill and Feather (F&F) method. In the F&F approach, a void is replaced with the most accurate digital elevation source ("fill") available with the void-specific perimeter bias removed. Then the interface is feathered into the SRTM, smoothing the transition to mitigate any abrupt change. It works optimally when the two surfaces are very close together and separated by only a bias with minimal topographic variance. The Delta Surface Fill (DSF) process replaces the void with fill source posts that are adjusted to the SRTM values found at the void interface. This process causes the fill to more closely emulate the original SRTM surface while still retaining the useful data the fill contains.

Despite the advantages such prior art approaches may provide in certain applications, further advancements may be desirable for error detection and correction in geospatial and other model data. This is particularly true for voids in geographical data sets, as well as seams that may occur when attempting to merge two or more geospatial (e.g., DEM) data set portions together.

SUMMARY OF THE INVENTION

In view of the foregoing background, it is therefore an object of the present invention to provide a geospatial modeling system and related methods for merging geospatial data sets with a reduction in detectable or visible seams between the sets.

This and other objects, features, and advantages are provided by a geospatial modeling system which may include a geospatial model data storage device, and a processor cooperating with the geospatial model data storage device for merging first and second geospatial data sets for corresponding first and second geospatial regions. The processor may be for generating seam-smoothed geospatial data for a corresponding selected geospatial region between adjacent portions of the first and second geospatial regions by applying Poisson's equation to data from at least one of the first and second geospatial data sets for the selected geospatial region using boundary conditions. This may be done based upon data along corresponding interfaces between the selected geospatial region and adjacent portions of the first and second geospatial regions. Accordingly, the system may advantageously merge geospatial data sets with little or no detectable or visible seams therebetween.

More particularly, the first and second geospatial data sets may be different types of geospatial data sets. Also, the first and second geospatial regions may overlap in some embodiments. Moreover, the overlap between the first and second geospatial regions may define the selected geospatial region. Additionally, the processor may preserve a higher gradient of two respective gradients at the overlap. In some other embodiments the first and second geospatial regions may be abutting.

In addition, the processor may iteratively apply Poisson's equation to data from at least one of the first and second geospatial data sets for the selected geospatial region. By way of example, the first and second geospatial data sets may be first and second digital elevation model (DEM) data sets. Further, at least one of the first and second geospatial data sets may be a Light Detection and Ranging (LIDAR) data set. Also, at least one of the first and second geospatial data sets may be a correlated imagery data set. The geospatial modeling system may further include a display coupled to the processor for displaying a geospatial model image based upon the merged first and second geospatial data sets.

A related geospatial modeling method may include providing first and second geospatial data sets for corresponding first and second geospatial regions. The method may further include generating seam-smoothed geospatial data for a corresponding selected geospatial region between adjacent portions of the first and second geospatial regions by applying Poisson's equation to data from at least one of the first and second geospatial data sets for the selected geospatial region using boundary conditions based upon data along corresponding interfaces between the selected geospatial region and adjacent portions of the first and second geospatial regions. In addition, the first and second geospatial data sets may be merged based upon the seam-smoothed geospatial data.

DETAILED DESCRIPTION OF THE PREFERRED EMBODIMENTS

Figure 1:
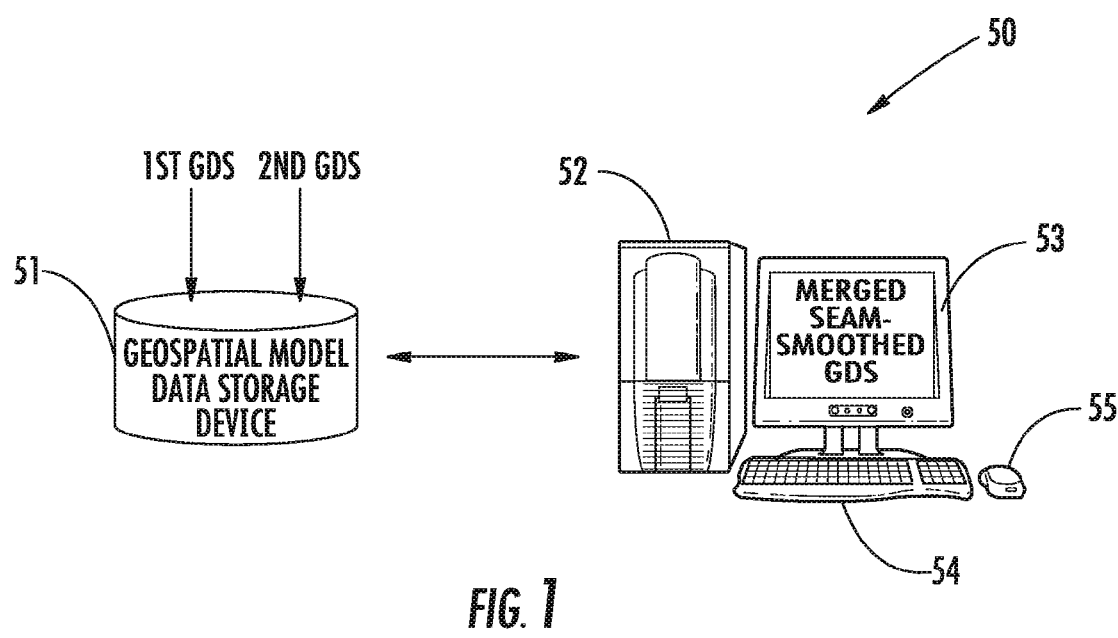
FIG. 1 is a schematic block diagram of a geospatial modeling system providing Poisson-based geospatial data set merging features in accordance with the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Referring initially to FIGS. 1 through 4, a geospatial modeling system 50 and associated method aspects of the invention are first described. The system 50 illustratively includes a geospatial model data storage device 51 and a processor 52, which may include a central processing unit (CPU) of a PC, Mac, or other computing workstation, for example. A display 53 may be coupled to the processor 52 for displaying geospatial model images, as will be discussed further below. Various input devices, such as a keyboard 54, mouse 55, etc. may also be used for user interaction with the processor 52.

Beginning at Block 70, the processor 52 advantageously cooperates with the geospatial model data storage device 51 for merging first and second geospatial data sets (GDSs) 60, 61 for corresponding first and second geospatial regions, which are provided at Block 71. As discussed above, the first and second geospatial data sets 60, 61 may be obtained by suitable sources such as LIDAR, optical imagery, SAR/IF-SAR, etc. By way of example, the data sets 60, 61 may be digital elevation model (DEM) data sets each corresponding to a particular geographic region or area, although other geospatial data formats may also be used, as will be appreciated by those skilled in the art.

In particular, there exist situations when producing geospatial models requires that more than one DEM or data set be merged together to provide a desired coverage area of a particular geographical area of interest for a user. For example, in some applications a bundle of images (e.g., LIDAR, SAR/IFSAR, optical, etc.) may be ingested into an elevation extraction process, and the images are typically broken down into manageable pieces or files due to processing restraints. Moreover, DEMs from separate or different collection sources (e.g., LIDAR source(s), optical source(s), SAR/IFSAR source(s), etc.) may need to be merged to provide coverage for the desired geographical area, as a single data set covering the entire area may not be available (i.e., without incurring the expense of performing another data capture for the entire area). Furthermore, sometimes DEMs with varying levels of detail (e.g., resolution, etc.) may need to be merged to create a scene with desired resolution in given regions.

The above-described LiteSite® site modeling system from Harris Corp. advantageously implements a DEM merge algorithm (HDMA) that can smooth a merged region to advantageously reduce seams between different DEMs. However, this approach may still require registration, multi-resolution merging, and "feathering." Other existing techniques, such as interpolation algorithms, typically tend to excessively smooth height values so that the desired level of detail is lost in the final output. Thus, despite the advantages of such procedures, the results of typical automated seam removal/reduction techniques may not provide adequate results in many applications, or may require a significant amount of manual touch-up to become usable, which may be time and cost prohibitive.

In the illustrated embodiment, the data sets 60, 61 are positioned in such a way that their boundaries are overlapping one another as shown, and the overlap defines a selected geospatial region 62 (which is shown with stippling for clarity of illustration). Rather than employing prior techniques such as registration and feathering (although these steps may still be used in some embodiments), the processor 32 may advantageously generate seam-smoothed geospatial data for the corresponding selected geospatial region 62 between the adjacent portions of the first and second geospatial regions by applying Poisson's equation to data from one or both of the first and second geospatial data sets for the selected geospatial region, at Block 72. That is, the adjacent portions of the first and second data sets 60, 61 are the non-overlapping portions thereof (i.e., the portions outside of the selected geospatial region 62). An exemplary Poisson partial differential equation (PDE) that may be used for the seam-smoothing is as follows:

$$(\nabla^2 u)_{ij} = \frac{1}{dx^2}(u_{i+1,j} + u_{i-1,j} + u_{i,j+1} + u_{i,j-1} - 4u_{ij}) = g_{ij}. \quad (1)$$

More particularly, equation (1) is applied using boundary conditions based upon data along corresponding interfaces 63t, 63b, 63l, 63r between the selected geospatial region and adjacent portions of the first and second geospatial regions 60, 61, as will be appreciated by those skilled in the art. For the present example, data from both of the adjacent portions of the first and second data sets are provided as inputs to the Poisson PDE, as will also be appreciated by those skilled in the art. In other embodiments, data from only the first or second data may be used. The corresponding interfaces 63t, 63b, 63l, 63r between the selected geospatial region and adjacent portions of the first and second geospatial regions 60, 61 are shown as dashed lines in FIG. 4.

Figure 2:
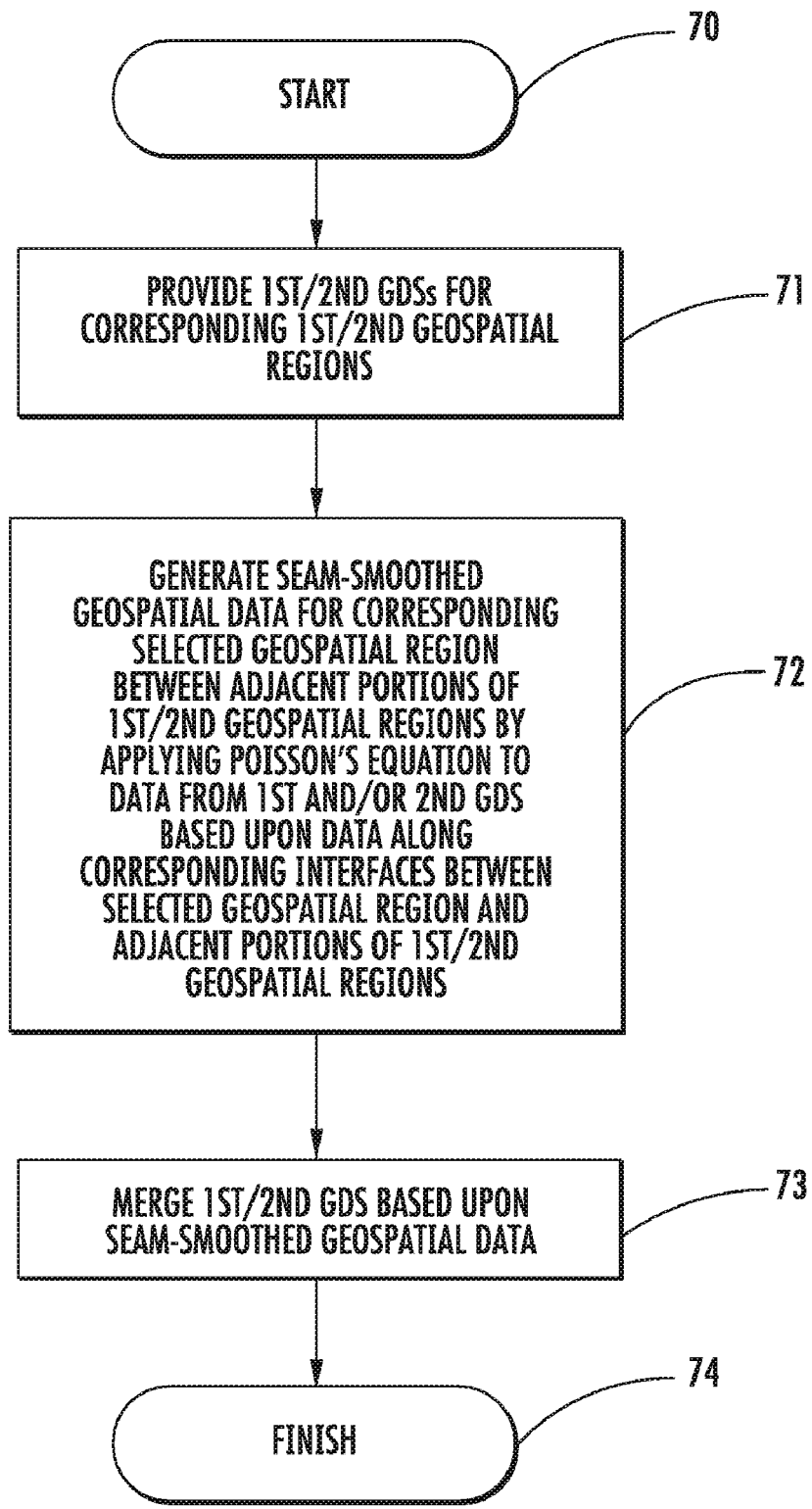
FIGS. 2 and 3 are flow diagrams illustrating Poisson-based geospatial data set merging method aspects of the invention.
Figure 3:
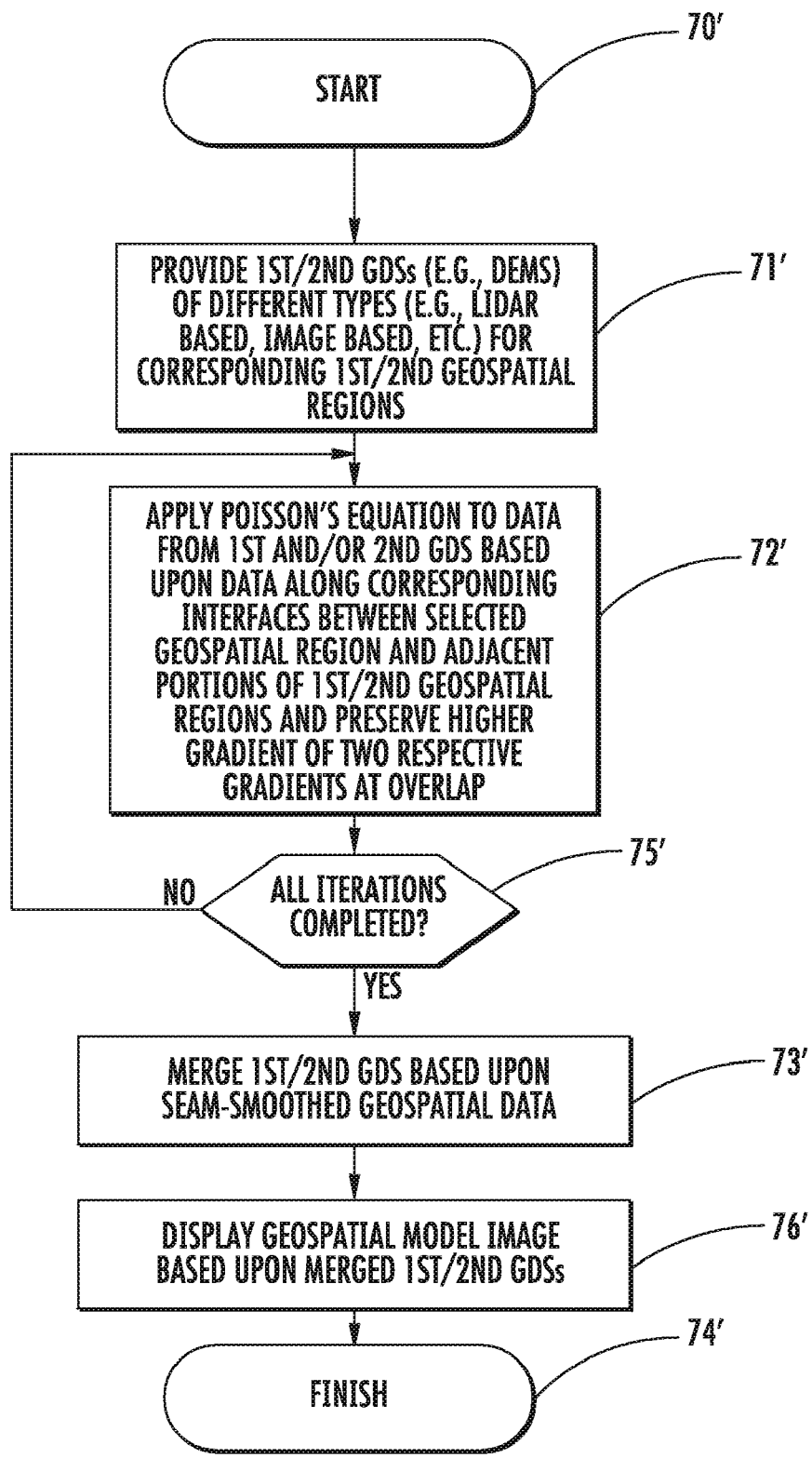
Figure 4:
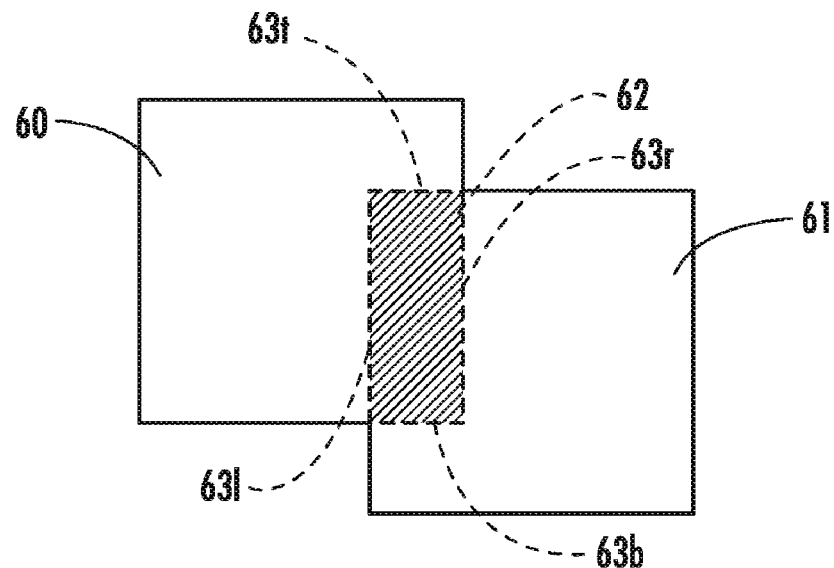
FIGS. 4-6 are schematic geospatial data set views illustrating merging operations of the system of FIG. 1.

The seam-smoothed geospatial data takes the place of the overlapping portions of the first and second data sets 60 and 61, and the remaining portions of the first and second data sets may then be merged together with the seam-smoothed geospatial data accordingly to produce a final geospatial data set with little or no detectable or visible seams therein, at Block 73, thus concluding the method illustrated in FIG. 2 (Block 74). In the alternative embodiment illustrated in FIG. 3, Poisson's equation is applied iteratively to the data to generate the seam-smoothed geospatial data for the region 62, at Block 75'. The resulting final geospatial data set (e.g., DEM) may be displayed on the display 53, at Block 76'.

Stated alternatively, the present approach advantageously "describes" the way the final output data set should look mathematically (i.e., the goal), and then iteratively modifies the selected geospatial region 62 until the difference between the goal and the current state of the data is reduced numerically to within an acceptable threshold. This is accomplished by iteratively solving, for the mathematical description of the selected geospatial region 62, the Poisson PDE of equation (1) in this overlapped region. The implementation of the Poisson PDE has the effect of matching the internal variation in the overlap area with the elevation postings that bound the overlap area, as will be appreciated by those skilled in the art.

So, if the region 61 is represented by a function f, the region 60 is represented by a function f', and the selected geospatial region 62 is represented by a function f'', the processor 52 iteratively finds a value of f'' such that the solution to the Poisson PDE is given by:

$$\Delta f''=f^*, \quad (2)$$

where f* is the mathematical description of the preferred solution. The boundary interfaces for the top and left sides 63t, 63l of the selected geospatial region 62 are taken from f', and the bottom and right sides 63b, 63r of the selected geospatial region are taken from f.

The above-described Poisson PDE merging technique may advantageously provide merging over the entire selected geospatial region 62, and it may match boundary values for the entire selected geospatial region as well, even for geospatial data sets from different sources (e.g., LIDAR, optical imagery, etc.), although same source data sets may be merged as well. Moreover, this approach may advantageously maintain relationships between elevation postings within the selected geospatial region 62, it need not require user input (i.e., it may be fully automated or partially automated), and it may also be performed without additional steps such as feathering at the end of the process because this approach provides essentially seamless merges. Accordingly, the above-described approach is less likely to blur edge content, which can be particularly important for preserving topography in geospatial data sets such as DEMs, for example.

Figure 5:
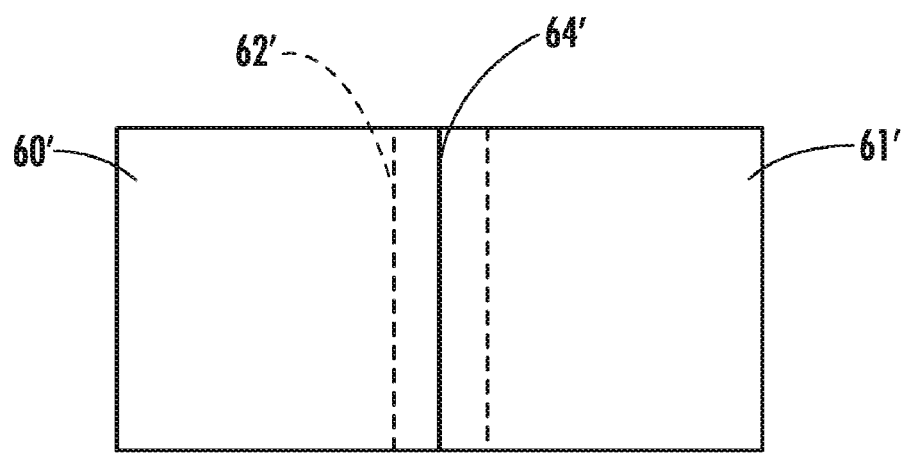
Figure 6:
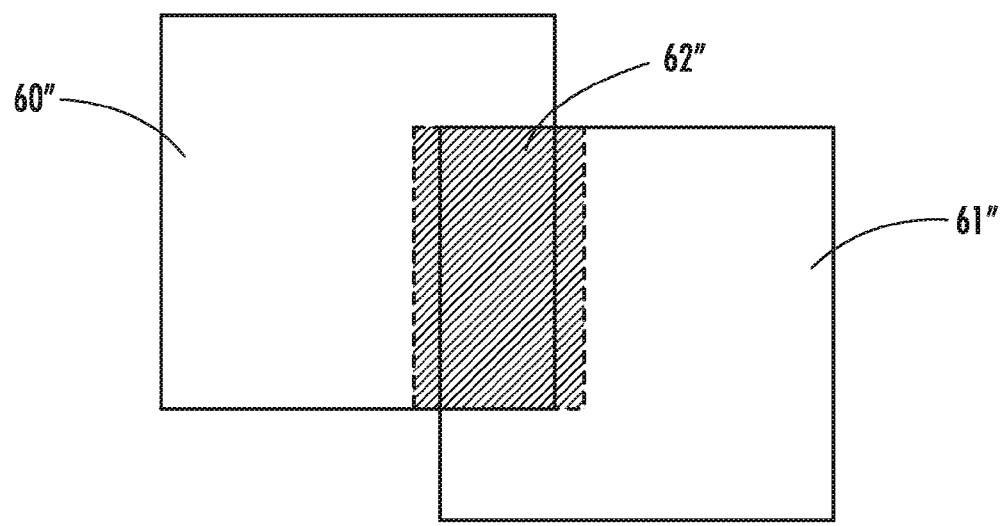
Figure 7:
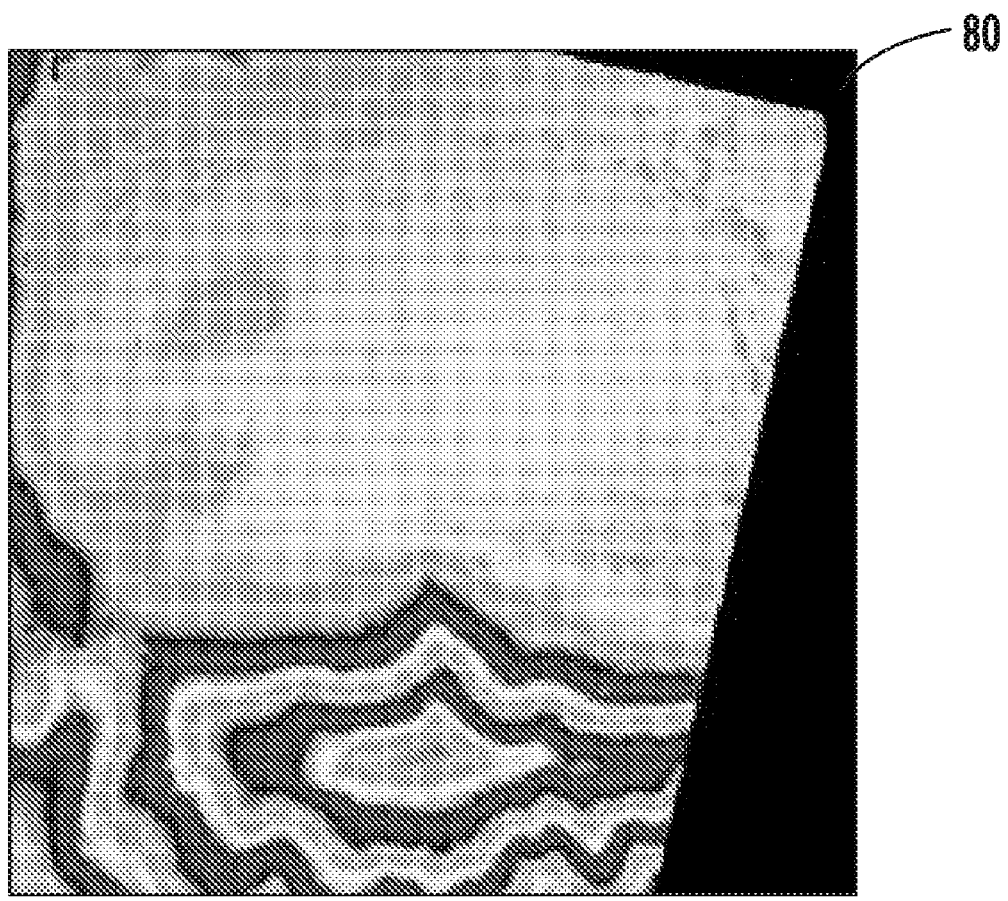
FIGS. 7-15 and 17-18 are digital elevation model (DEM) views illustrating merging and smoothing operations of the system of FIG. 1.
Figure 8:
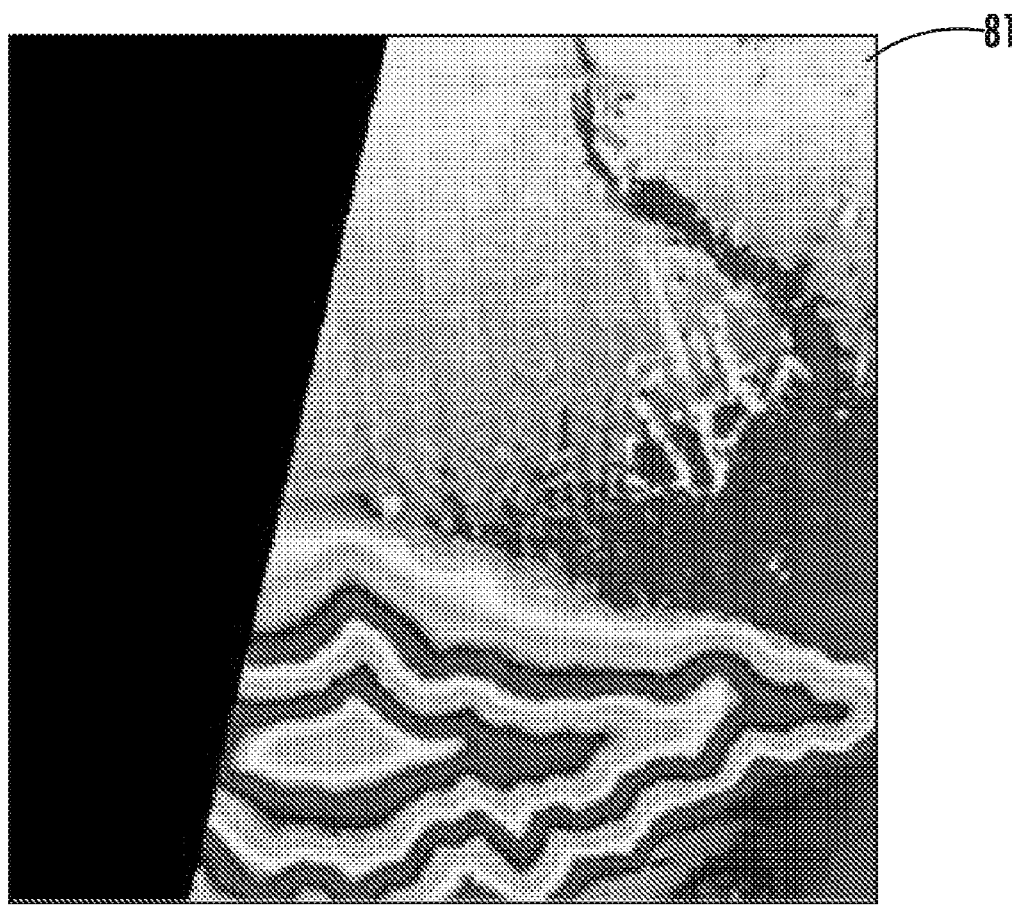

As seen in FIG. 5, the present approach may also be used without overlapping the first and second data sets 60', 61'. In the illustrated example, the first and second data sets 60', 61' are abutting such that a common side of each defines a boundary interface 64' therebetween. The input for the Poisson PDE therefore is based upon this boundary interface 64' and data from the first and second data sets on either side thereof. The selected geospatial region 62' in such an embodiment may be defined to be a certain number of posts, distance, etc., to either side of the boundary interface 64', as will be appreciated by those skilled in the art. It is also possible in some embodiments that there may be a partial gap between the first and second data sets 60', 61' (i.e., they are not immediately adjacent or abutting one another). Still another possibility is shown in FIG. 6, wherein the first and second data sets are overlapping, but the selected geospatial region 62" is defined to be bigger than just the overlapping portions, as shown.

The foregoing will be further understood with reference to particular examples thereof, the first of which is presented in FIGS. 7 through 12. More particularly, input DEMs 80 and 81 are respectively shown in FIGS. 7 and 8. The DEM 80 is generated from correlated images, while the DEM 81 is generated from LIDAR data, as will be appreciated by those skilled in the art. In some embodiments, the processor 52 may generate these DEMs, or they may be generated before hand by a different system/application. By way of example, the above-described Poisson merging techniques may be implemented in the RealSite® and/or LiteSite® site modeling systems described above, which also provide DEM generation from "raw" LIDAR data, optical data, etc., as well as other features, although these techniques may be implemented in other platforms or applications as well, as will be appreciated by those skilled in the art.

Figure 9:
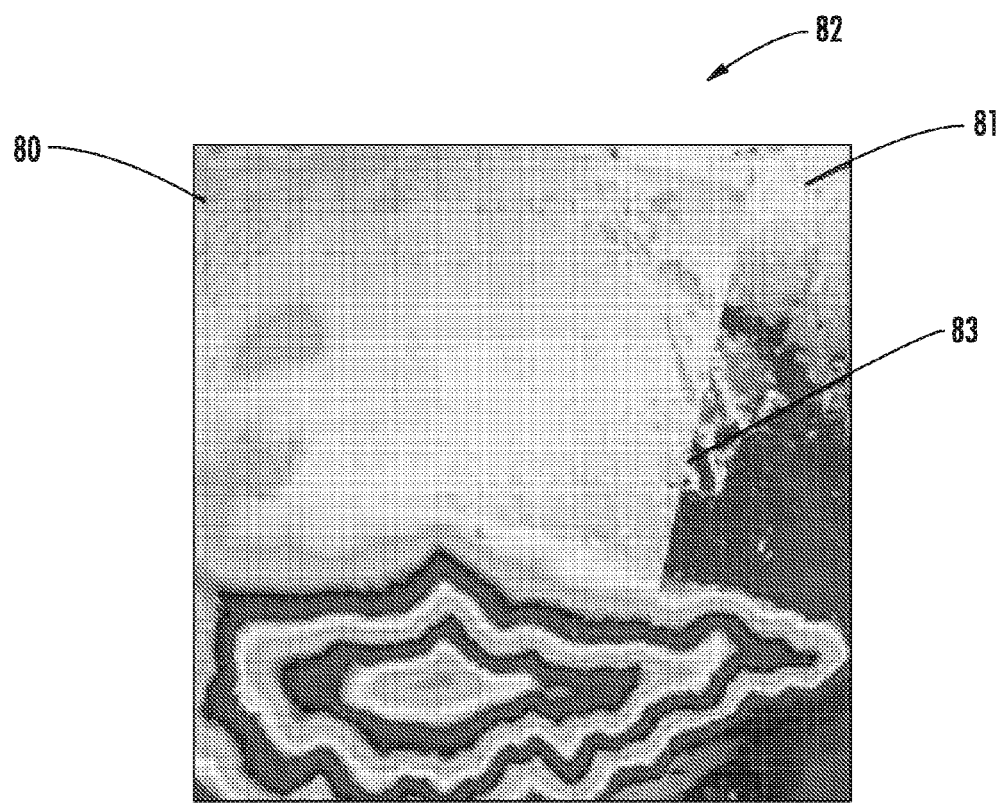
Figure 10:
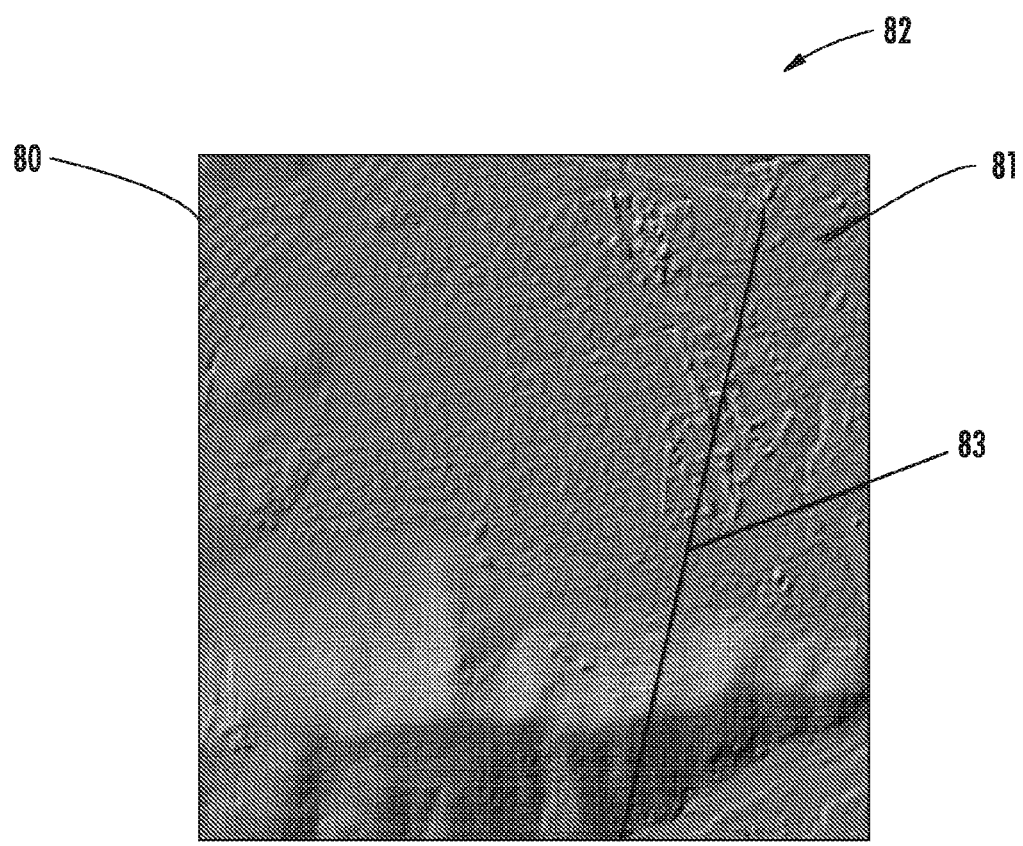
Figure 11:
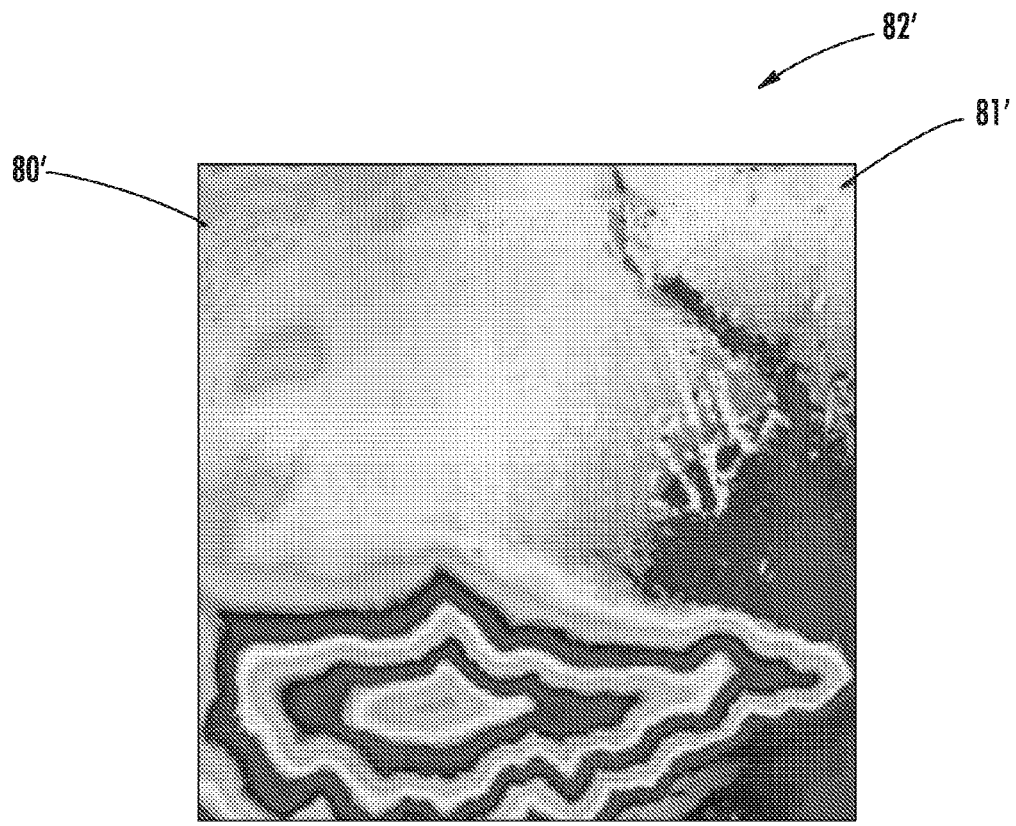
Figure 12:
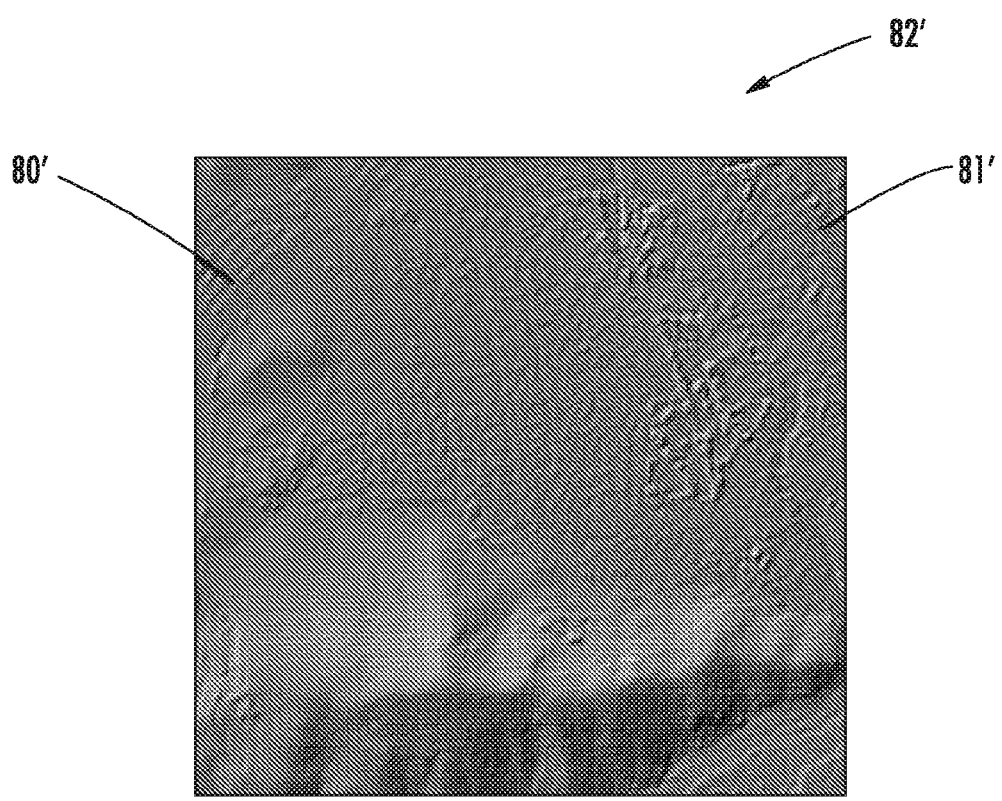
Figure 13:
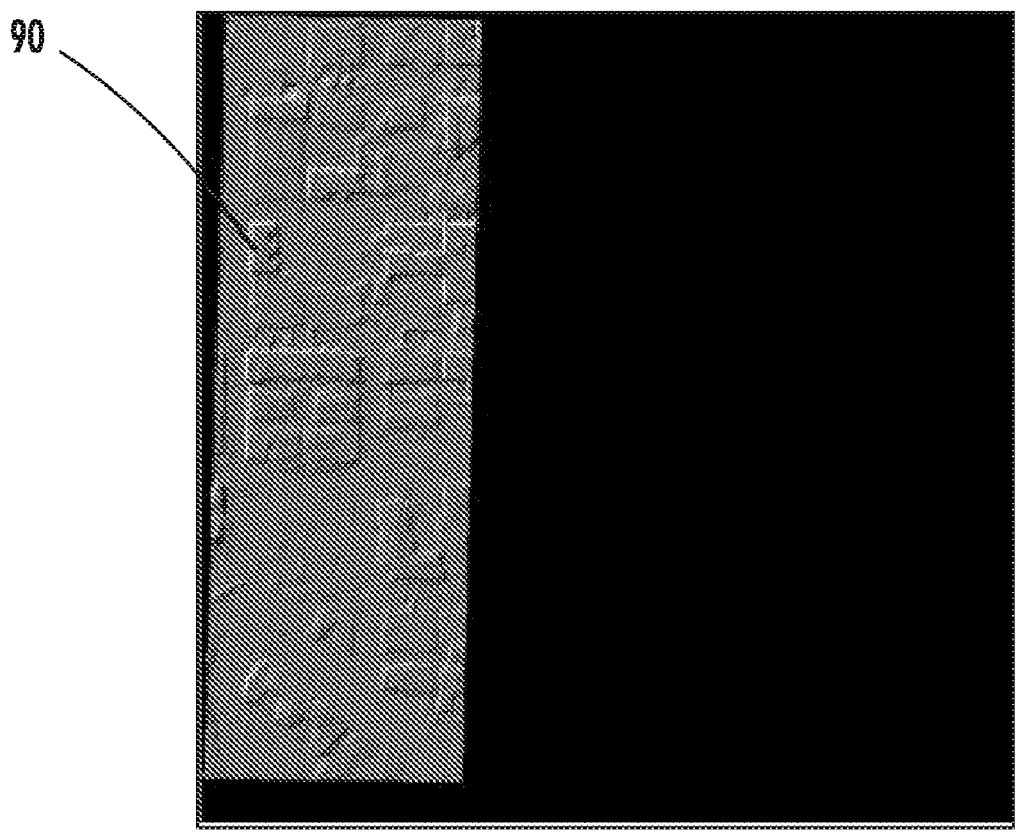

A DEM 82 generated by simply abutting the input DEMs 80, 81 (i.e., without any further smoothing processing) is shown in FIGS. 9 and 10, where FIG. 10 is a shaded relief view. Here seams 83 are plainly evident in the resulting DEM image, which is generally undesirable for users. However, when the same DEM 82' is generated using the Poisson-based merging techniques described above, as shown in FIGS. 11 and 12, the seams are no longer evident.

Figure 14:
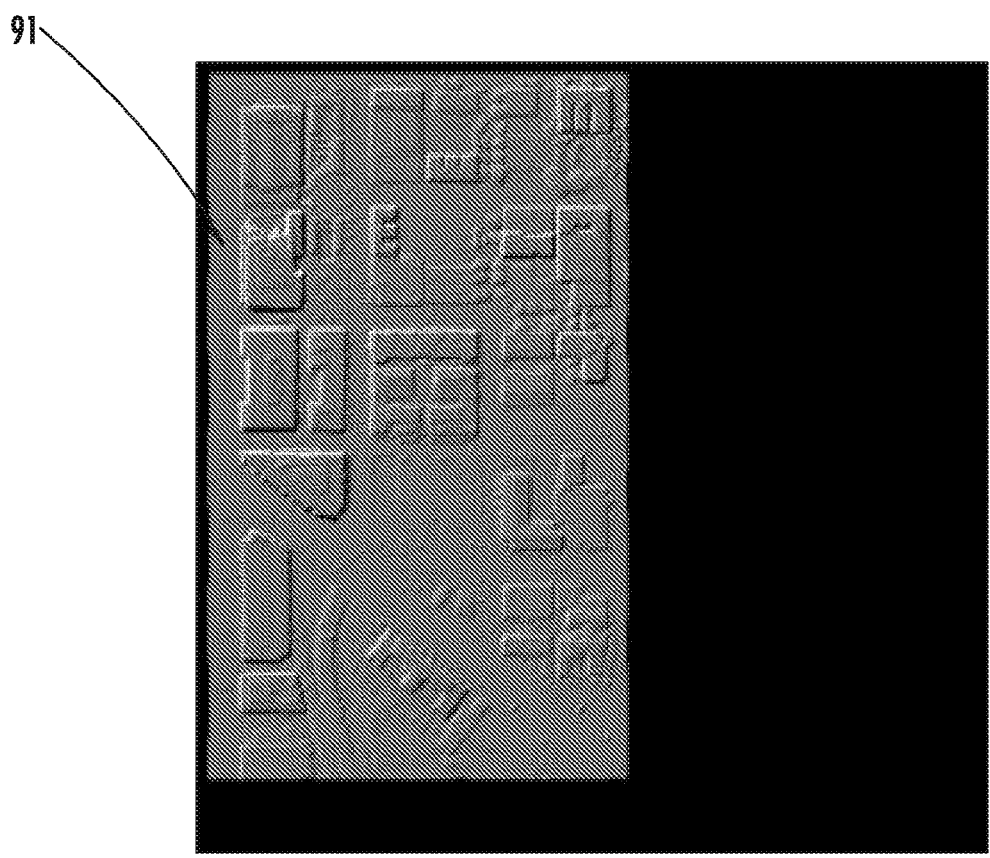
Figure 15:
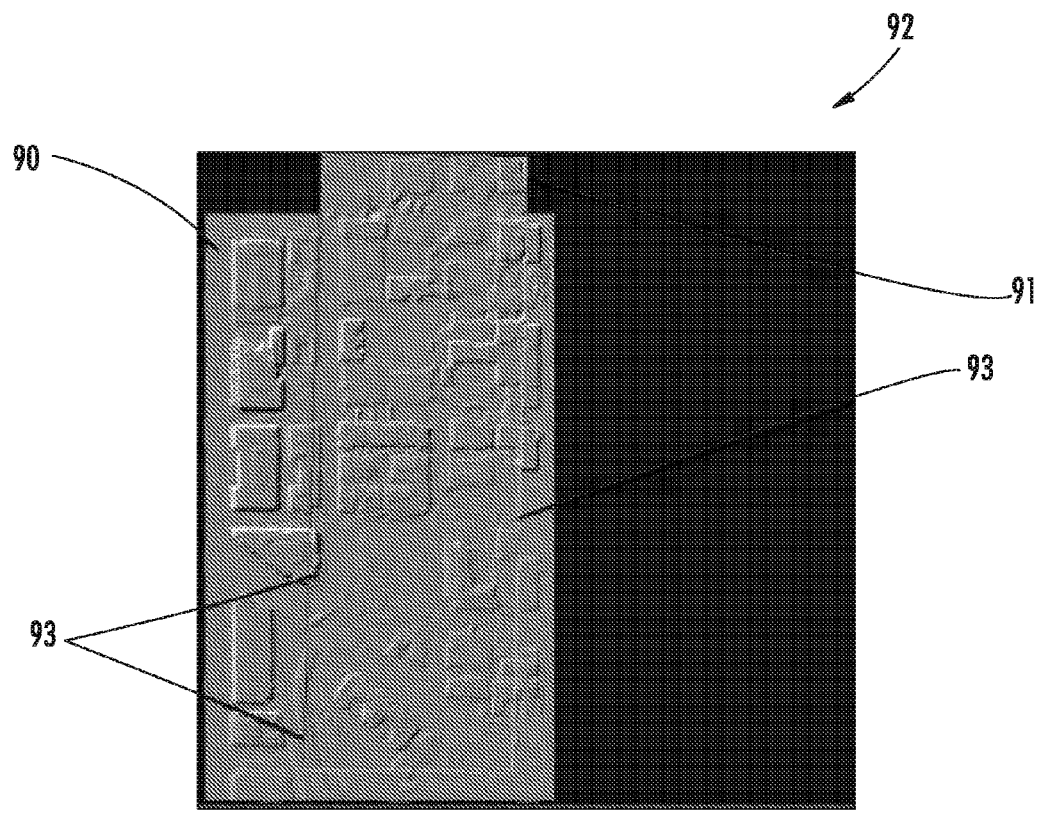
Figure 16:
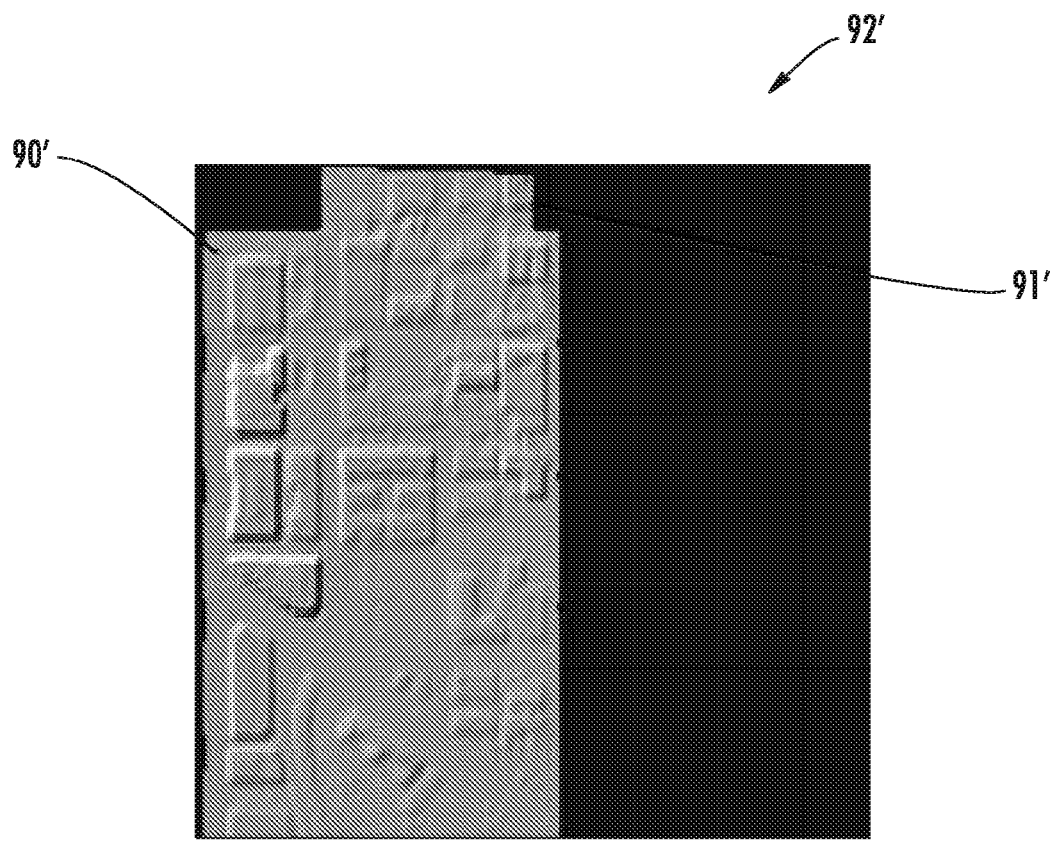
FIG. 16 is a corresponding DEM view illustrating a prior art smoothing technique for comparison purposes.

Another example is shown in FIGS. 13 through 18, all of which are shaded relief DEM views. In the present example, the inputs are a correlated imagery DEM 90 (FIG. 13) and a LIDAR DEM 91 (FIG. 14). When these two inputs DENS 90 and 91 are simply abutted together without any smoothing to provide the DEM 92 in FIG. 15, seams 93 become evident, as well as a disagreement in feature position for the various buildings and structures in the resulting DEM image. By way of comparison, using the above-noted prior art HDMA algorithm (or typical prior art interpolation algorithms) provides a merged DEM 92' which, although substantially free from seams, has a significant loss of detail as compared to the two original DEMs 90 and 91 in the overlapping region, as seen in FIG. 16.

Figure 17:
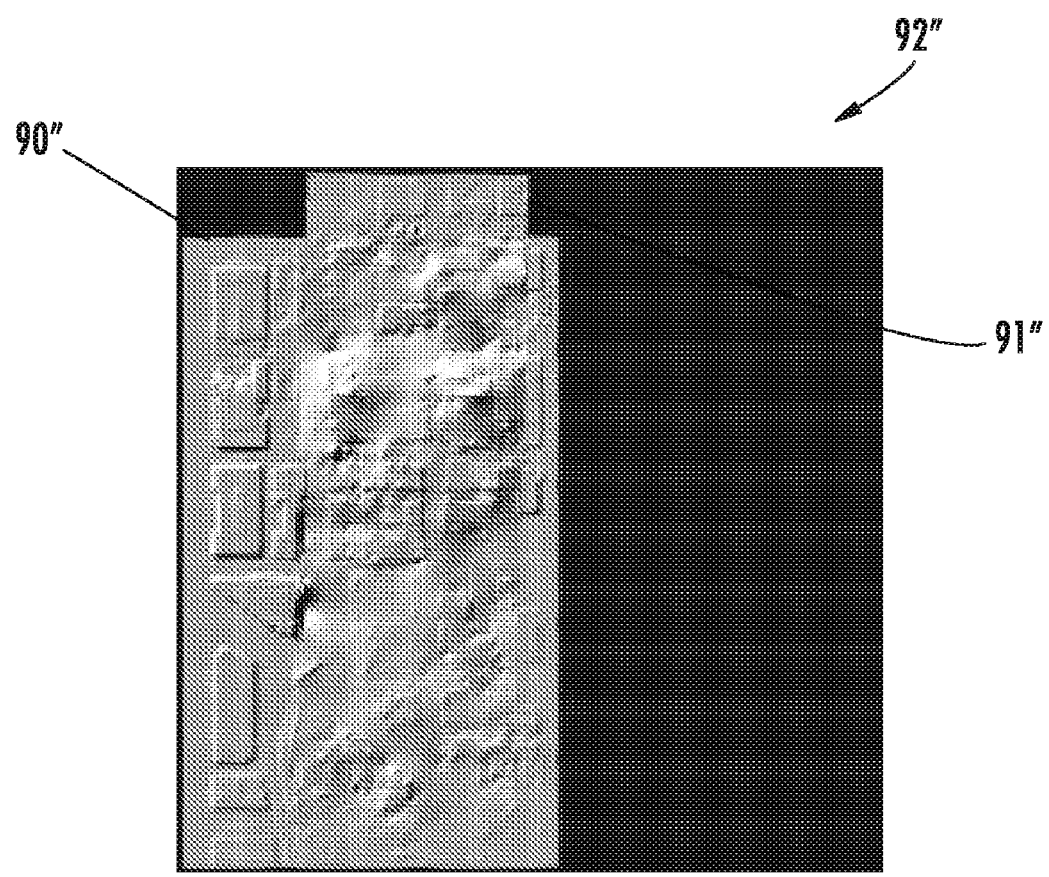
Figure 18:
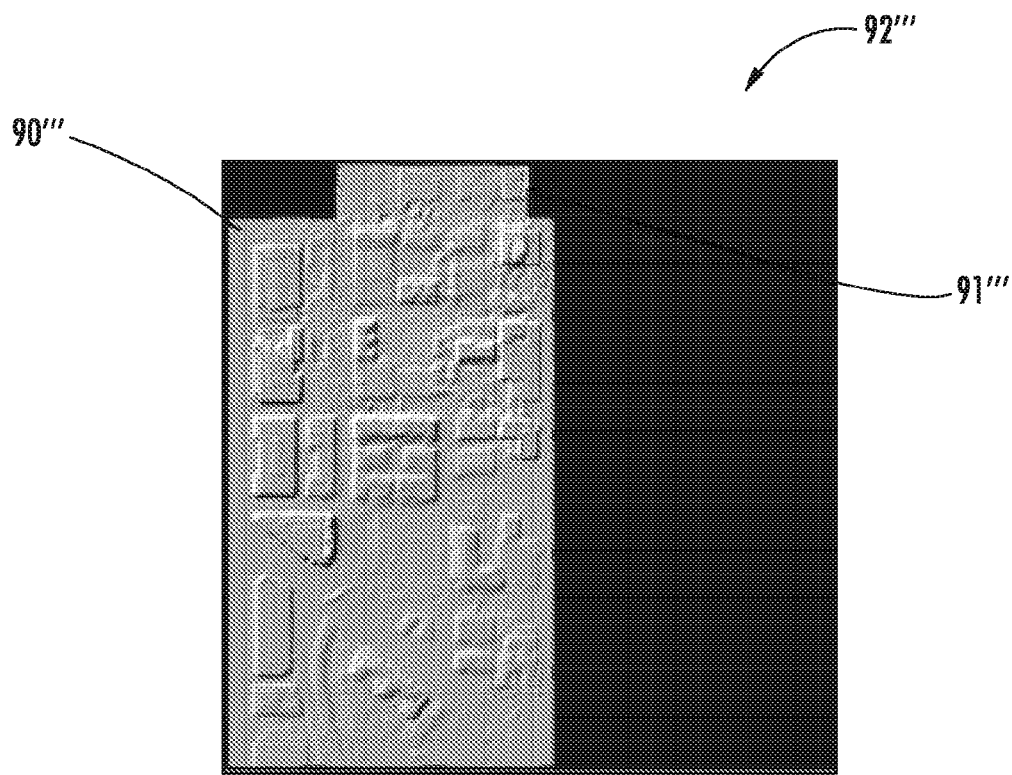
Figure 19:
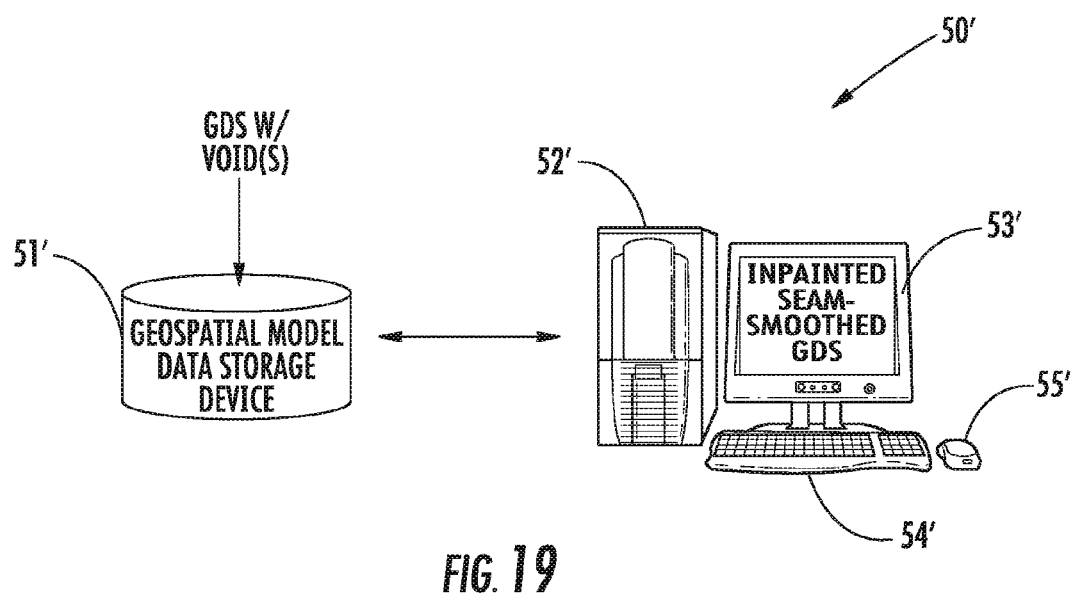
FIG. 19 is a schematic block diagram of an alternative geospatial modeling system providing Poisson-based geospatial data set exemplar inpainting features in accordance with the invention.

Using the basic Poisson region description set forth above produces the output DEM 92" shown in FIG. 17. Because this is a particularly complicated scene with numerous buildings and structures that have distinct transitions (e.g., building edges vs. bare earth) therein, the basic mathematical description set forth above may not provide fully satisfactory results. However, in such applications, an alternative implementation of the Poisson merging may be used in which the processor 52 preserves a higher gradient of two respective gradients at the overlap (Block 72' of FIG. 3). As seen in FIG. 18, such a mathematical description of the goal or overlap region 62 provides a much cleaner merging of features in the resulting DEM 92'" than the basic Poisson merging approach and with seams removed. The application of these two approaches may therefore depend upon the particular features within the DEMs to be merged, and both techniques could be used within a same final DEM (e.g., two terrain DEM pieces are merged using the basic Poisson merge, while two city area pieces are merged using the alternative approach, etc.).

The above-described Poisson merging techniques may also advantageously be implemented for performing exemplar-based inpainting in a geospatial model data set, which essentially involves merging one or more regions or patches from within a geospatial data set into a void in the data set. Turning now to FIGS. 19 through 25, in an alternative embodiment the processor 52' cooperates with the geospatial model data storage device 51' for inpainting seam-smoothed, void-fill data into one or more voids 221 in a geospatial data set 220 for a geospatial region. In the illustrated example, the geospatial region is a mountainous region, but the void filling techniques described herein may be used for void filling in data sets for various types of geospatial or geographical regions, as will be appreciated by those skilled in the art.

More particularly, beginning at Block 200, once provided with the geospatial data set 220 having one or more voids 221 therein (Block 201), the processor 52' selects raw void-fill data from within the geospatial data set, at Block 202. Additional background on exemplar-based inpainting within geospatial model data and the selection of raw void-fill data for void inpainting is provided in U.S. application Ser. No. 11/874,299, which is assigned to the present Assignee Harris Corp., and which is also hereby incorporated herein in its entirety by reference.

Figure 20:
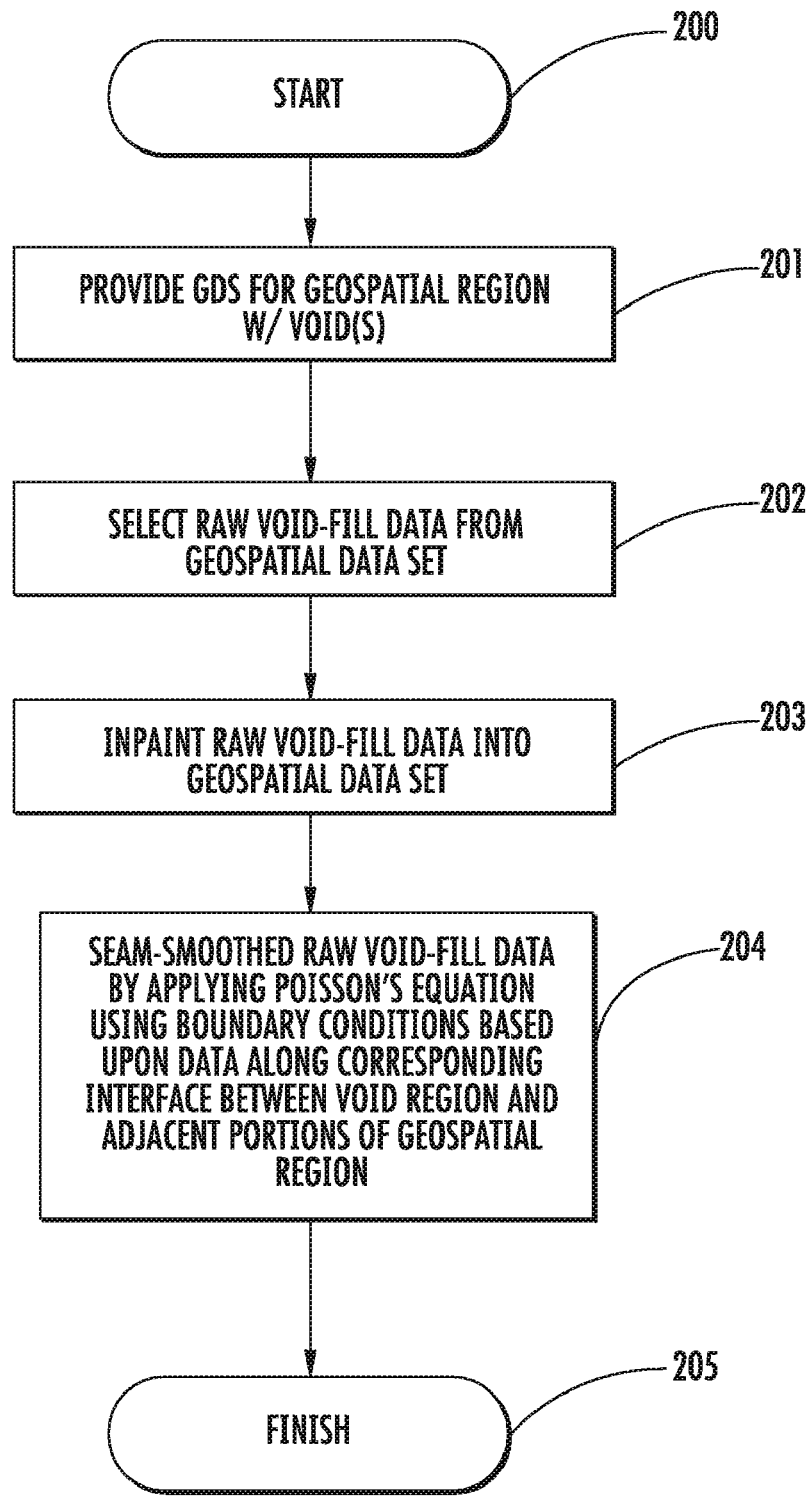
FIGS. 20 and 21 are flow diagrams illustrating Poisson-based geospatial data set exemplar inpainting method aspects of the invention.
Figure 21:
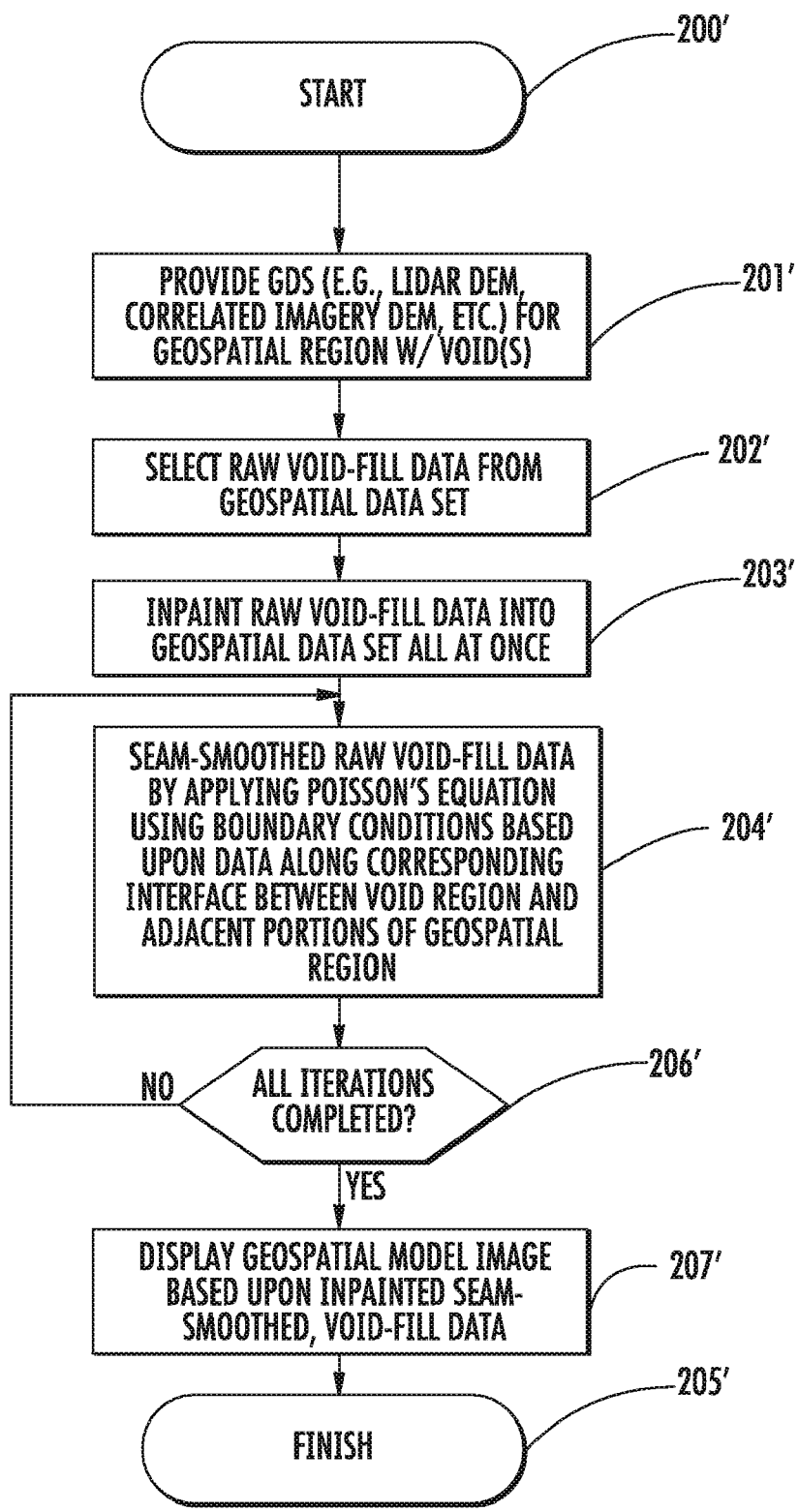
Figure 22:
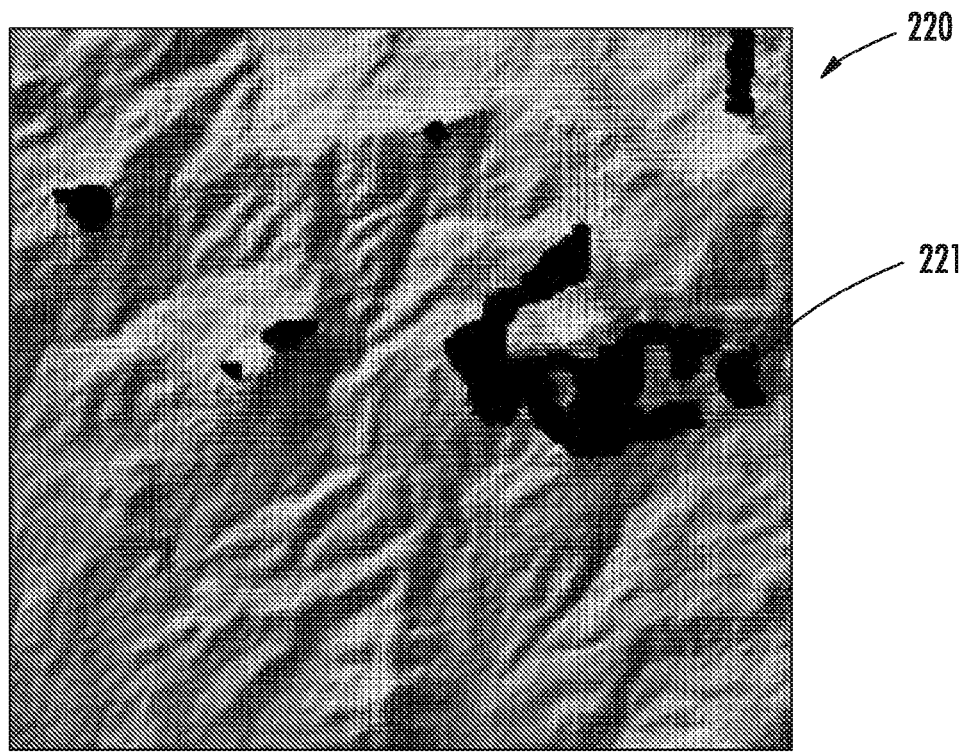
FIGS. 22 and 24-28 are DEM views illustrating inpainting operations of the system of FIG. 19.

The processor 52' advantageously inpaints the raw void-fill data in the respective voids 221 and seam-smoothes the new void-fill data by applying Poisson's equation thereto using boundary conditions based upon data along a corresponding interface between the void region and adjacent portions of the geospatial region, at Blocks 203-204, thus concluding the method illustrated in FIG. 20 (Block 205). More particularly, the interface between the void region and the adjacent portions is defined by the outline or border of the void 221. It should be noted that although the inpainting step (Block 203) is illustratively before the seam-smoothing step (Block 204), in some embodiments the inpainting may occur simultaneously with (or after) the seam-smoothing operations, as will be appreciated by those skilled in the art.

Again, the application of the Poisson PDE to the raw void-fill data is preferably done in an iterative fashion, as described above, at Block 207', although a single iteration may be possible in some applications. The resulting geospatial model image may also be displayed based upon the inpainted seam-smoothed, void-fill data, at Block 207'.

One significant advantage of the present approach is that it is particularly well suited for providing desired fill accuracy for all-at-once exemplar fills, i.e., filling a void with a single fill or patch rather than a plurality of successive fills or patches (Block 203'). By way of background, the above-described LiteSite® modeling system utilizes an exemplar inpainting algorithm that performs a statistical analysis to locate a top candidate in the original input data set to fill a given void region. During the exemplar filling process, it is generally preferable to run the exemplar inpainting void filling algorithm in a mode that allows the entire region to be filled all-at-once. Compared to a patch-based scheme, an all-at-once fill approach provides enhanced efficiency and reduces chances for inconsistencies.

Nonetheless, even with the ability to identify and transform a relatively large pool of potential fill candidates into fill data, it may still be difficult to use the all-at-once approach is some applications, and thus to use it as the default approach. This is because a single fill may still leave seams, either full or partial, along the boundary of the void region that was filled. This may occur when there are discrepancies between the top statistical match and the fill target region, for example. Moreover, even when all other aspects of the fill match closely, other problems may arise that make a single fill inpainting operation unsatisfactory in some applications.

Figure 23:
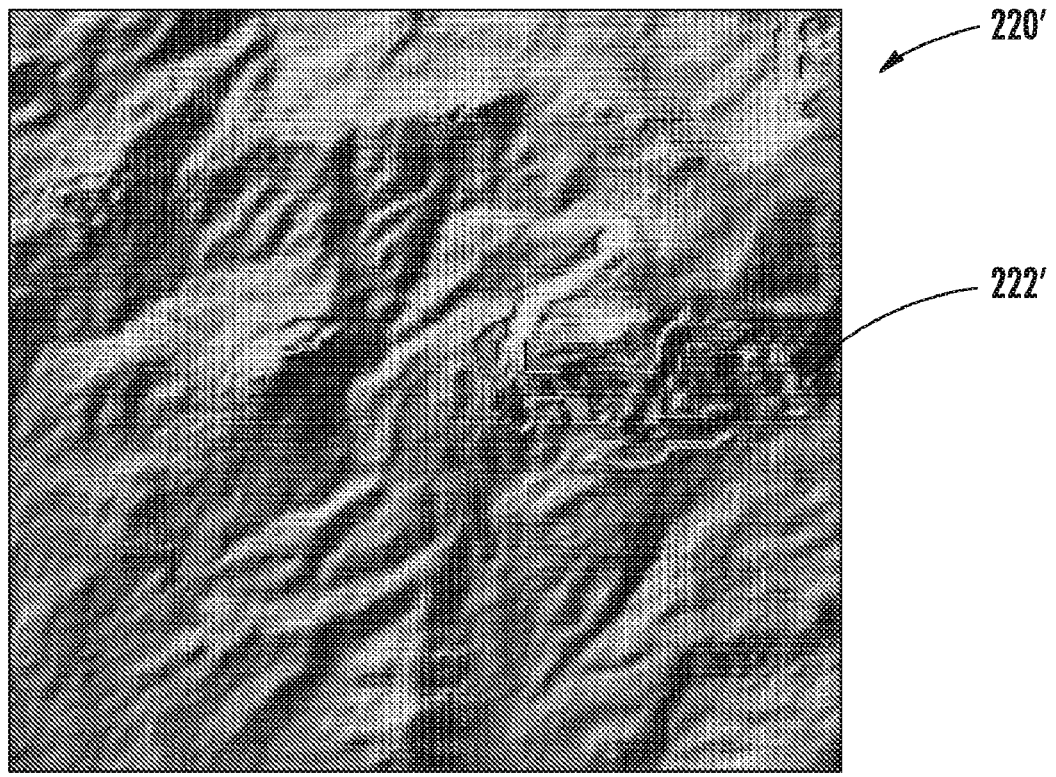
FIG. 23 is a corresponding DEM view illustrating a prior art inpainting technique for comparison purposes.
Figure 24:
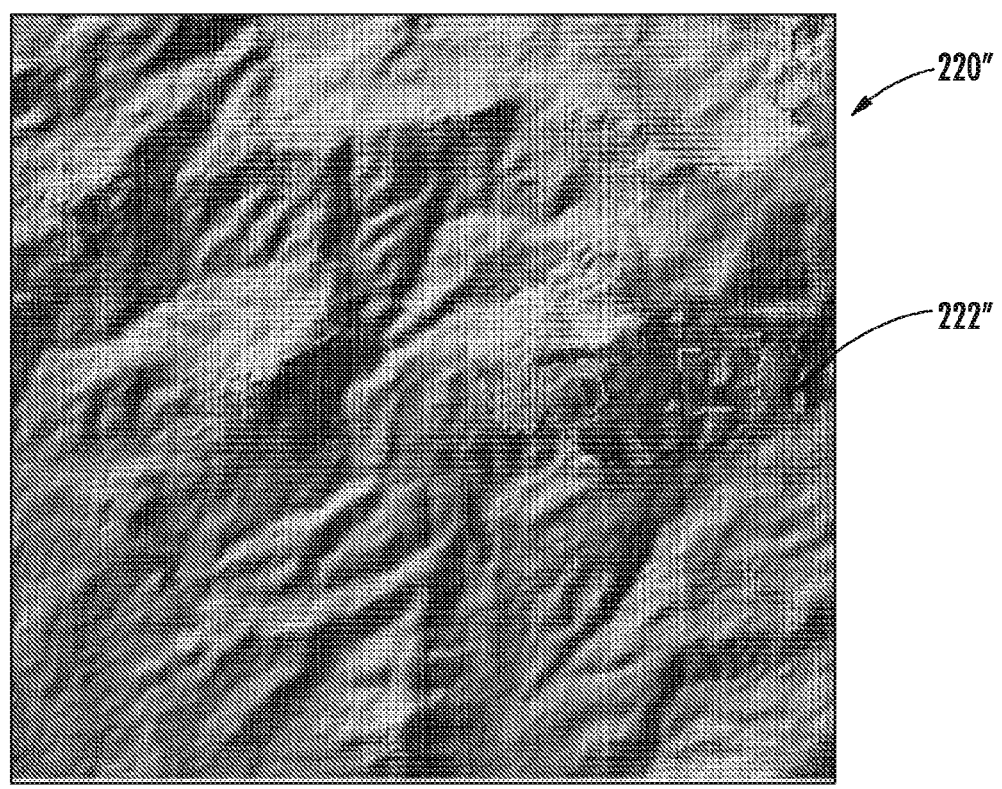
Figure 25:
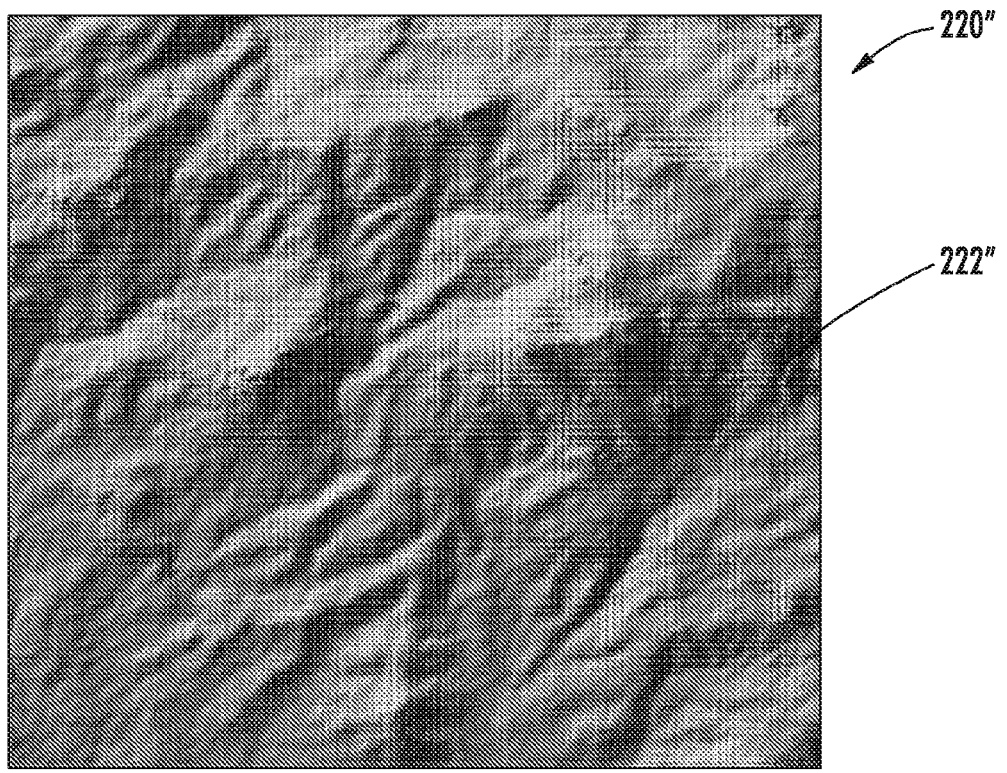

However, by using the Poisson-based inpainting approach described above rather than an adjust-copy-paste of the top candidate region into the void region, this may provide a substantially seamless merge of the candidate region in the void region. By way of comparison, the results of a prior art void fill by interpolation are shown in FIG. 23. Here, there are noticeable seams 222' still present where the void 221 was inpainted. The same geospatial data set 220" is shown in FIGS. 24 and 25 with an all-at-once exemplar fill in the void 221 before and after, respectively, application of the Poisson PDE smoothing. As shown, the seams 222" present in FIG. 24 are much less noticeable after application of the Poisson PDE (FIG. 25).

Figure 26:
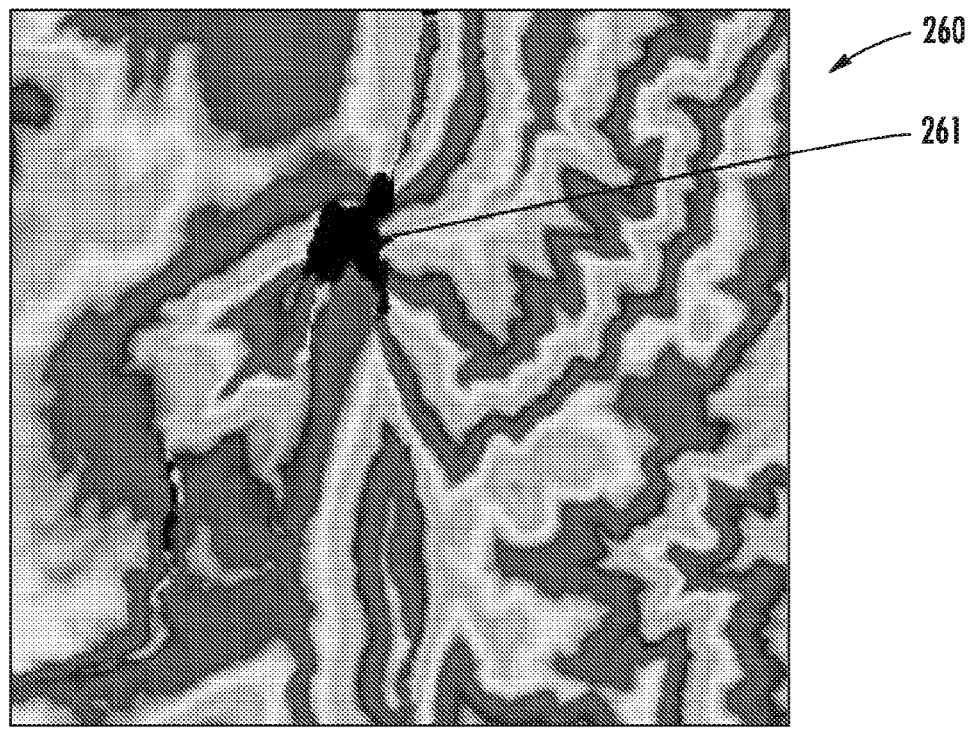
Figure 27:
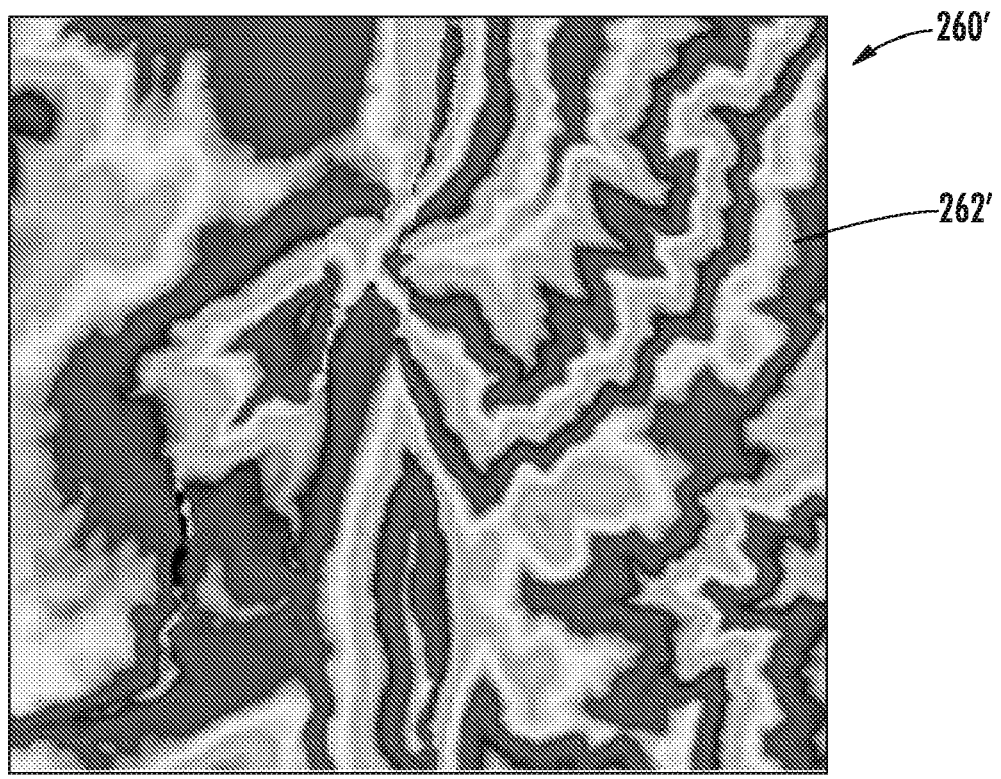
Figure 28:
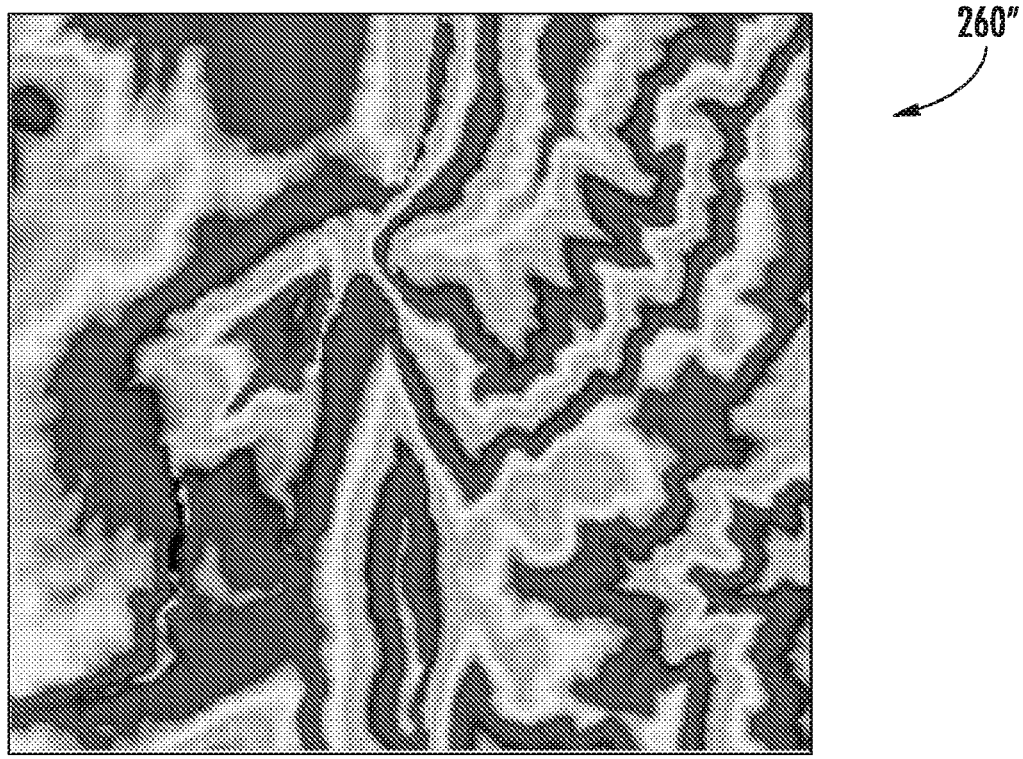

Another example of a more pronounced (and therefore difficult) mountainous region is shown in FIGS. 26-28. Here, a DEM 260 has an irregularly shaped void 261 therein. After inpainting of selected raw void-fill data into the void 261' all-at-once, seams 222' are evident in the DEM image (FIG. 27). However, after application of the Poisson PDE approach set forth above, the seams are significantly reduced in the DEM 260", as seen in FIG. 28.

The Poisson PDE exemplar-based inpainting approach therefore advantageously leverages the benefits of exemplar inpainting, which include processing speed and preservation of original feature detail, for example, with the advantageous smoothing benefits of the Poisson PDE. Both the merging and inpainting approaches described above may advantageously be applied in image space as well as DEM space, as will be appreciated by those skilled in the art. Further general background information on Poisson image editing may be found in an article by Perez et al. entitled "Poisson Image Editing," published by Microsoft Research UK, 2003, which is hereby incorporated herein in its entirety by reference.

Other features and advantages of the invention are set forth in co-pending patent application filed concurrently herewith and assigned to the Assignee of the present invention entitled GEOSPATIAL MODELING SYSTEM PROVIDING POISSON-BASED VOID INPAINTING AND RELATED METHODS, Ser. No. 12/030,372, the entire disclosure of which is hereby incorporated herein in its entirety by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
a geospatial model data storage device; and
a processor configured to cooperate with said geospatial model data storage device for merging first and second geospatial data sets for corresponding first and second geospatial regions, with the merging being performed without requiring registration;
said processor further configured to generate
a mathematical description of a corresponding selected geospatial region between adjacent portions of the first and second geospatial regions, and
seam-smoothed geospatial data for the corresponding selected geospatial region based on the mathematical description by applying Poisson's equation to data from at least one of the first and second geospatial data sets for the selected geospatial region using boundary conditions based upon data along corresponding interfaces between the selected geospatial region and adjacent portions of the first and second geospatial regions.

2. The geospatial modeling system of claim 1 wherein the first and second geospatial data sets comprise different types of geospatial data sets.

3. The geospatial modeling system of claim 1 wherein the first and second geospatial regions overlap.

4. The geospatial modeling system of claim 3 wherein the overlap between the first and second geospatial regions defines the selected geospatial region.

5. The geospatial modeling system of claim 3 wherein said processor preserves a higher gradient of two respective gradients at the overlap.

6. The geospatial modeling system of claim 1 wherein the first and second geospatial regions are abutting.

7. The geospatial modeling system of claim 1 wherein said processor iteratively applies Poisson's equation to data from at least one of the first and second geospatial data sets for the selected geospatial region.

8. The geospatial modeling system of claim 1 wherein the first and second geospatial data sets comprise first and second digital elevation model (DEM) data sets.

9. The geospatial modeling system of claim 1 wherein at least one of the first and second geospatial data sets comprises a Light Detection and Ranging (LIDAR) data set.

10. The geospatial modeling system of claim 1 wherein at least one of the first and second geospatial data sets comprises a correlated imagery data set.

11. The geospatial modeling system of claim 1 further comprising a display coupled to said processor, for displaying a geospatial model image based upon the merged first and second geospatial data sets.

12. A geospatial modeling system comprising:
a geospatial model data storage device; and
a processor configured to cooperate with said geospatial model data storage device for merging first and second geospatial data sets for corresponding first and second geospatial regions, with the merging being performed without requiring registration, and with the first and second geospatial data sets comprising different types of geospatial data sets;
said processor further configured to generate
a mathematical description of a corresponding selected geospatial region between adjacent portions of the first and second geospatial regions, and
seam-smoothed geospatial data for a the corresponding selected geospatial region based on the mathematical description by iteratively applying Poisson's equation to data from at least one of the first and second geospatial data sets for the selected geospatial region using boundary conditions based upon data along corresponding interfaces between the selected geospatial region and adjacent portions of the first and second geospatial regions.

13. The geospatial modeling system of claim 12 wherein the first and second geospatial regions overlap.

14. The geospatial modeling system of claim 13 wherein the overlap between the first and second geospatial regions defines the selected geospatial region.

15. The geospatial modeling system of claim 13 wherein said processor preserves a higher gradient of two respective gradients at the overlap.

16. The geospatial modeling system of claim 12 wherein the first and second geospatial regions are abutting.

17. A geospatial modeling method comprising:
storing first and second geospatial data sets for corresponding first and second geospatial regions in a geospatial model data storage device;

operating a processor to cooperate with the geospatial model data storage device to generate a mathematical description of a corresponding selected geospatial region between adjacent portions of the first and second geospatial regions, generate seam-smoothed geospatial data for the corresponding selected geospatial region based on the mathematical description by applying Poisson's equation to data from at least one of the first and second geospatial data sets for the selected geospatial region using boundary conditions based upon data along corresponding interfaces between the selected geospatial region and adjacent portions of the first and second geospatial regions; and merge the first and second geospatial data sets based upon the seam-smoothed geospatial data without requiring registration.

18. The method of claim 17 wherein the first and second geospatial data sets comprise different types of geospatial data sets.

19. The method of claim 17 wherein the first and second geospatial regions overlap.

20. The method of claim 19 wherein the overlap between the first and second geospatial regions defines the selected geospatial region.

21. The method of claim 19 wherein generating the seam-smoothed geospatial data comprises preserving a higher gradient of two respective gradients at the overlap.

22. The method of claim 17 wherein the first and second geospatial regions are abutting.

23. The method of claim 17 wherein generating the seam-smoothed geospatial data comprises iteratively applying Poisson's equation to data from at least one of the first and second geospatial data sets for the selected geospatial region.

24. The method of claim 17 further comprising a display coupled to the processor for displaying a geospatial model image based upon the merged first and second geospatial data sets.

* * * * *